(12) United States Patent
Sabatini

(10) Patent No.: US 6,597,289 B2
(45) Date of Patent: Jul. 22, 2003

(54) FINGERPRINT SENSOR POWER MANAGEMENT DETECTION OF OVERCURRENT

(75) Inventor: Marco Sabatini, Kensington, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/920,530

(22) Filed: Jul. 31, 2001

(65) Prior Publication Data

US 2003/0025606 A1 Feb. 6, 2003

(51) Int. Cl.[7] .............................................. G08B 21/00
(52) U.S. Cl. ........................................ 340/635; 257/532
(58) Field of Search ........................ 340/635; 257/532, 257/632, 534

(56) References Cited

U.S. PATENT DOCUMENTS

| | | | | |
|---|---|---|---|---|
| 6,098,330 A | * | 8/2000 | Schmitt et al. ............ 42/70.11 |
| 6,180,989 B1 | * | 1/2001 | Bryant et al. ................ 257/414 |
| 6,346,739 B1 | * | 2/2002 | Lepert et al. ................ 257/532 |
| 6,370,965 B1 | * | 4/2002 | Knapp .................... 73/862.046 |
| 6,408,087 B1 | * | 6/2002 | Kramer ...................... 382/124 |

\* cited by examiner

Primary Examiner—John Tweel
(74) Attorney, Agent, or Firm—Lisa K. Jorgenson; William A. Munck

(57) ABSTRACT

A power management unit monitors current drawn by a fingerprint sensor circuit and generates a "heartbeat" signal during normal operation. If a latchup event occurs, with attendant increase in current drawn by the fingerprint sensor circuitry, the heartbeat signal terminates and an interrupt is subsequently triggered to start a latchup recovery routine. Power to the fingerprint sensor circuitry is switched off and the interrupt is then cleared by writing appropriate values to control bits within the power management register.

23 Claims, 3 Drawing Sheets

FINGERPRINT SENSOR POWER MANAGEMENT DETECTION OF OVERCURRENT

TECHNICAL FIELD OF THE INVENTION

The present invention is directed, in general, to power management for integrated circuits and, more specifically, to power management with electrostatic discharge latchup event recovery for fingerprint sensor devices.

BACKGROUND OF THE INVENTION

Electrostatic discharge techniques normally employed for integrated circuits are often not entirely suitable or satisfactory for fingerprint sensor devices. Because such sensor devices must, of necessity, allow contact in proximity to the sensor circuitry, electrostatic discharge (ESD) protection to prevent latchup, circuit damage and other problems must be implemented in a different manner.

A primary requirement of power management for fingerprint sensor devices is the ability to restore operation of the fingerprint sensor circuitry following a latch-up condition triggered by an electrostatic discharge event. However, the same electrostatic discharge event occurring on the fingerprint sensor device and propagating inside the power management unit should not affect functionality of the power management unit.

Fingerprint sensor devices may be required to operate at a nominal 5V supply, although optional operation at 3.3 volts supply may also be desired. Whether the dual power supply voltage capability accomplished by a charge pump receiving 3.3 volts and generating the 5 volt power supply voltage level or by a power regulator running out of 5 volts to produce both voltage levels, the power management unit should control the power of the charge pump or power regulator, if present, as well as shutting down the power supply of the fingerprint sensor device at will.

There is, therefore, a need in the art for a power management system for fingerprint sensor devices which allows control over power to the fingerprint sensor device and enables recovery from electrostatic discharge events.

SUMMARY OF THE INVENTION

To address the above-discussed deficiencies of the prior art, it is a primary object of the present invention to provide, for use in a fingerprint detection system, a power management unit which monitors current drawn by a fingerprint sensor circuit and generates a "heartbeat" signal during normal operation. If a latchup event occurs, with attendant increase in current drawn by the fingerprint sensor circuitry, the heartbeat signal terminates and an interrupt is subsequently triggered to start a latchup recovery routine. Power to the fingerprint sensor circuitry is switched off and the interrupt is then cleared by writing appropriate values to control bits within the power management register.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
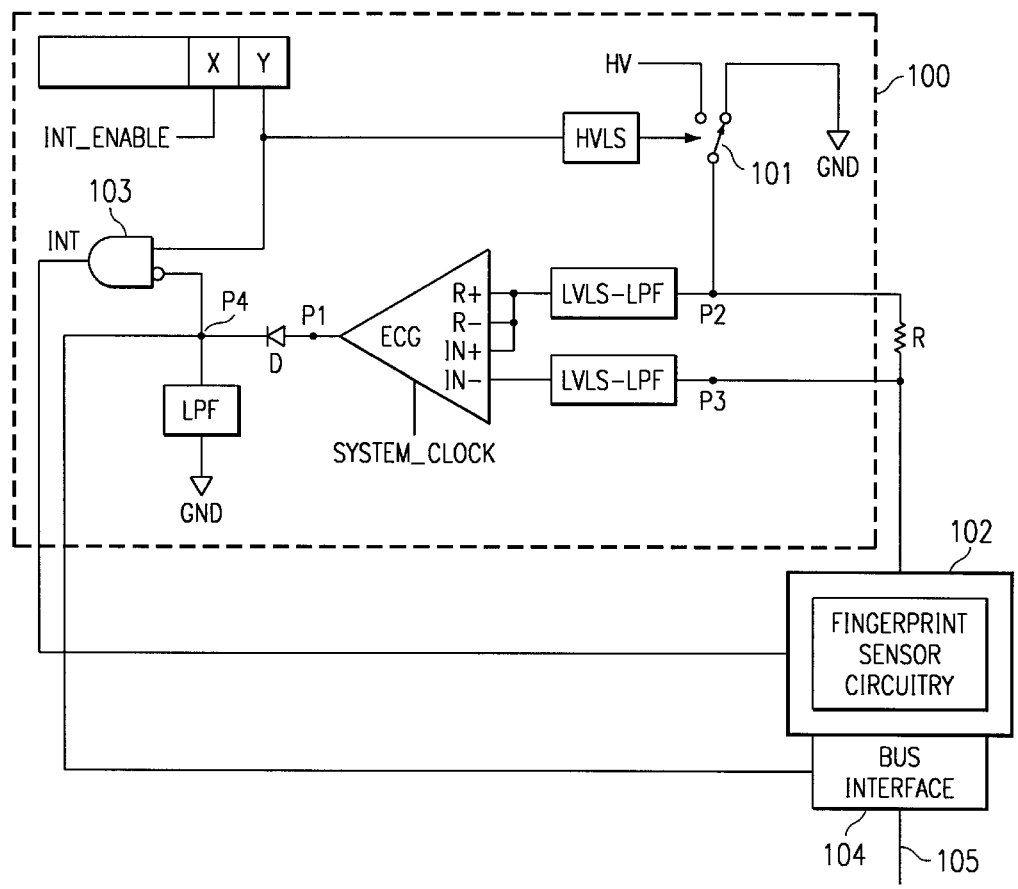
FIG. 1 depicts a power management system for a fingerprint sensor device according to one embodiment of the present invention.

FIG. 1 depicts a power management system for a fingerprint sensor device according to one embodiment of the present invention. Power management unit 100, an error check and correction (ECC) device, controls power flow from a power supply HV through an internal power switch 101. Power supply HV may be either a 5 volt or 3.3 volt power source. When connected to the power supply HV, power flows through an external sensing resistor R connected between nodes P2 and P3 within power management unit 100 to the fingerprint sensor device 102.

In the case of a latchup event, the fingerprint sensor device 102 will experience a substantial and permanent (as long as the power is applied) increase in current flowing through sensing resistor R. An "electrocardiogram" heartbeat unit ECG detects the attendant voltage drop increase between nodes P2 and P3. Implemented by a dynamic differential comparator with the R+, R−, and IN+ inputs all connected to node P2 and the IN− input connected to node P3, heartbeat unit ECG outputs a square wave synchronous with the system clock (the "heartbeat") when the fingerprint sensor device is powered and draws only the nominal current associated with normal operation. This heartbeat signal is rectified by diode D and filtered through a low pass filter LPF to provide a logical high or 1 signal at node P4 during normal operation.

When a latchup event occurs, the heartbeat unit ECG output stops "beating," providing, eventually, a logical low or zero output. After rectification and filtering of the ECG output, node P4 gradually discharges to the ground voltage, asserting the interrupt signal INT output at logic gate 103, assuming the interrupt enable bit X is on (a logical 1) and the power switch bit Y is also on. The interrupt signal is passed to the fingerprint sensor device 102 and/or any processor or controller controlling operation of the fingerprint sensor device 102 to initiate a reset or latchup recovery routine.

Grounding of node P4 also causes a bus interface 104 for the fingerprint sensing device 102 to ground the data bus 105 coupled to the fingerprint sensing device. The signal at node P4 may also be optionally routed, through the interrupt signal INT, to drive directly an ECC reset input for the fingerprint sensing device 102 and/or any associated processor or controller, staffing a latchup recovery routine.

Figure 2:
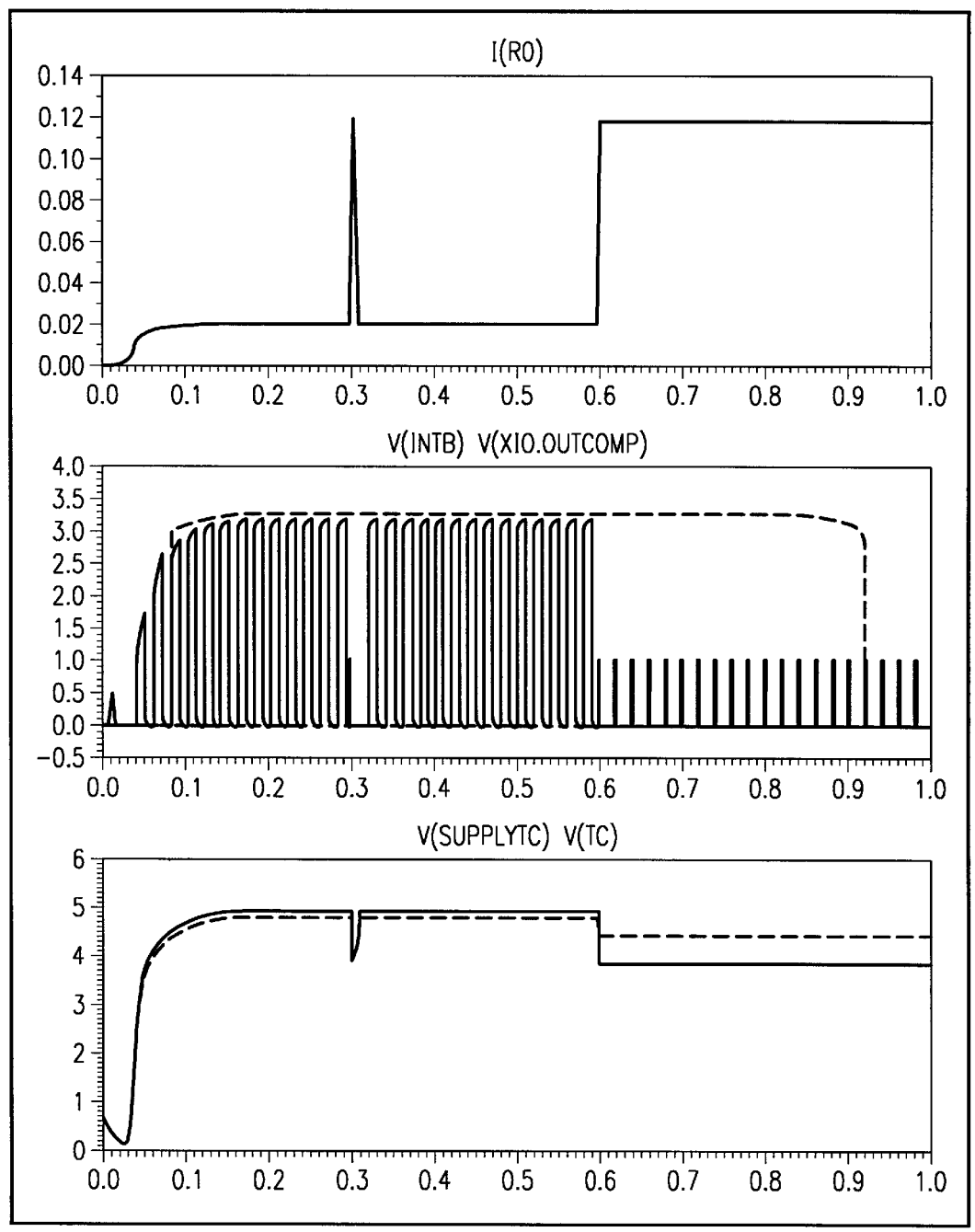
FIGS. 2 and 3 are each a series of related plots illustrating operation of a power management system for a fingerprint sensor device according to one embodiment of the present invention.
Figure 3:
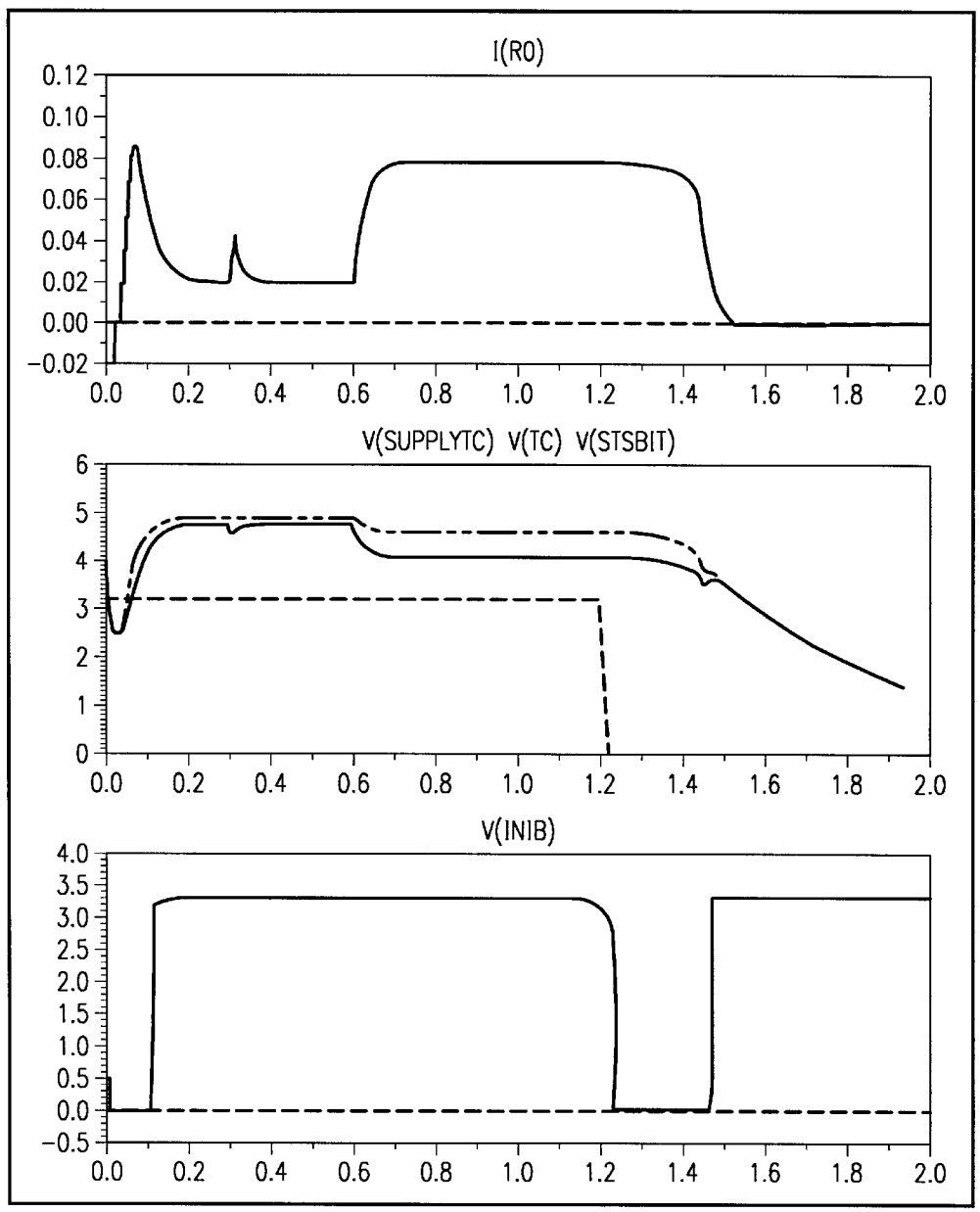

FIGS. 2 and 3 are each a series of related plots illustrating operation of a power management system for a fingerprint sensor device according to one embodiment of the present invention, and specifically the power management unit 100 depicted in FIG. 1. In FIG. 2, the top graph represents current through the sensing resistor R. At 300 nanoseconds (ns) an induced spike is shown and at 600 ns a latchup event is simulated, causing the current through sensing resistor R to increase to a high direct current (DC) value of 120 milliamps (mA) in the example shown. The induced spike, by not generating a false interrupt, shows that the monitor unit is not affected by random disturbances on the power supply (i.e. current through resistor R) while it triggers an interrupt when a real latch-up event occurs. The middle graph shows the corresponding output of the heartbeat unit ECG at node P1, as well as the signal at node P4. Activity at node P1 stops as soon as a latchup event occurs. After approximately 400 ns, node P4—which is the signal used to recover from the latchup event—goes to zero. The bottom graph shows the corresponding power supply voltage signal.

FIG. 3 shows a complete sequence of latchup and recovery. The top graph shows current through the sensing resistor R, with a latchup event occurring at about 600 ns with peak current of 80 mA. The bottom graph illustrates the corresponding signal at node P4, while the middle graph illustrates the voltages across sensing resistor R (at nodes P2 and P3) and the power control bit Y command to open the power switch 101. When the switch 101 is open, nodes P2 and P3 gradually discharge, causing a false transition to logic state 1 for node P4 but not affecting the operation since the interrupt signal INT has already been asserted.

Referring back to FIG. 1, in a preferred embodiment the latchup recovery routine triggered by the interrupt signal INT includes the following sequence of events, programmed into a read-only memory (ROM) within the ECC unit: (1) the fingerprint sensor power switch 101 is turned off by the power switch control bit Y within the power management unit 100; (2) the fingerprint sensor data lines are automatically grounded by the bus interface 104; and (3) after an appropriate delay, the startup sequence is launched.

The startup sequence in the exemplary embodiment is controlled by a boot program and includes a zero logic state for the power control bit Y, leaving power control switch 101 temporarily open, with the interrupt signal INT being disabled through the enable interrupt control bit X. These states are necessary since the heartbeat unit ECG would not produce a heartbeat while there is no power supplied to nodes P2 and P3. Through the power control bit Y, the power switch 101 is closed and, after an appropriate delay, the interrupt signal INT is enabled by writing a logic one to the interrupt enable control bit X.

Figure 4:
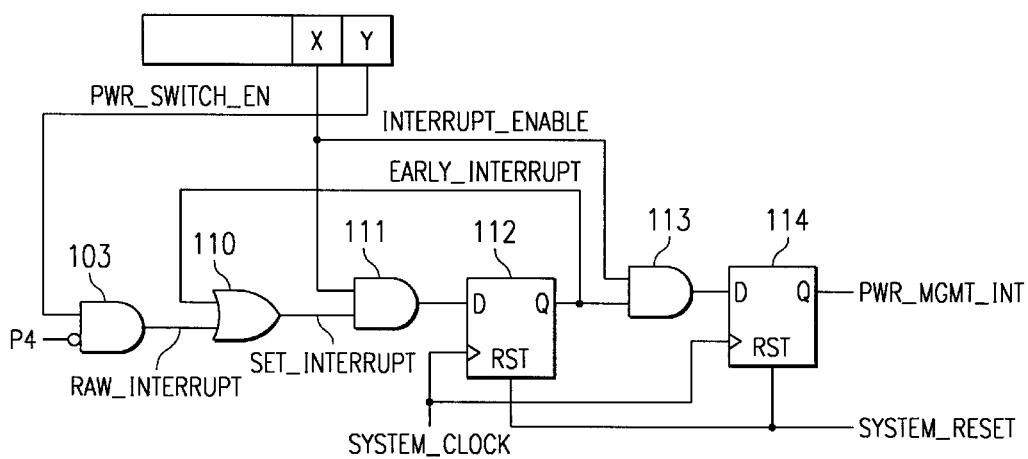
FIG. 4 depicts in greater detail control of an interrupt signal within a power management system for a fingerprint sensor device according to one embodiment of the present invention.

FIGURE 4 depicts in greater detail control of an interrupt signal within a power management system for a fingerprint sensor device according to one embodiment of the present invention. Logic gate 103 receives the inverted state of node P4 and the pwr_switch_en signal corresponding to the power switch enable bit Y within the power management register. Logic gate 110 receives the raw_interrupt signal output of logic gate 103 and an early_interrupt signal from the output of a first flip-flop 112. Logic gate 111 receives the set_interrupt signal output by logic gate 110 and an interrupt_enable signal corresponding to interrupt enable bit X within the power management register. Logic gate 113 also receives the interrupt_enable signal and the output of edge-triggered flip-flop 112 reflecting whether node P4 has discharged to ground (before transitioning to a false logic one as described above). Edge-triggered flip-flop 114 generates the power management interrupt signal pwr_mgmt_int.

At power up, the system reset clears the pwr_mgmt_int signal by writing zeros to the X and Y control bits of the power management register. When the power switch 101 is turned on by writing a logical 1 into control bit Y and subsequently enabling the interrupt by writing a logical 1 into control bit X, the circuit is ready to detect a change from high to low of node P4, caused by a latchup event in the fingerprint sensor device. At the next SYSTEM_CLOCK cycle, this transition is latched into pwr_mgmt_int. The routine responding to the interrupt, after taking care to ground the data bus lines, will turn the power switch 101 off by writing a zero into control bit Y, and will eventually clear the interrupt by writing a zero in control bit X.

Although the present invention has been described in detail, those skilled in the art will understand that various changes, substitutions, variations, enhancements, nuances, gradations, lesser forms, alterations, revisions, improvements and knock-offs herein may be made without departing from the spirit and scope of the invention in its broadest form.

What is claimed is:

1. For use in a fingerprint detection system, a power management unit for recovering from latchup conditions comprising:
   a connection to fingerprint sensor circuitry;
   a detection device for detecting current drawn by the fingerprint sensor circuitry; and
   a monitor coupled to the detection device and generating a heartbeat signal during normal operation of the fingerprint sensor circuitry, wherein the monitor stops producing the heartbeat signal when a change in current drawn by the fingerprint sensor circuitry indicates existence of a latchup condition within the fingerprint sensor circuitry.

2. The power management unit as set forth in claim 1 wherein the detection device comprises a resistor connected in series between a power supply and the fingerprint sensor circuitry, wherein the monitor senses changes in a voltage drop across the resistor to detect existence of a latchup condition within the fingerprint sensor circuitry.

3. The power management unit as set forth in claim 2 wherein the monitor does not indicate a latchup condition in response to false current spikes generated on a power supply providing the current drawn by the fingerprint sensor circuitry.

4. The power management unit as set forth in claim 2 wherein the monitor comprises a dynamic differential comparator having one input connected to one terminal of the resistor and a second input connected to a second terminal of the resistor.

5. The power management unit as set forth in claim 1 further comprising:
a conversion unit coupled to the monitor and generating an output signal having a first logical state when the heartbeat signal is being generated by the monitor and a second logical state when the heartbeat signal is not being generated by the monitor.

6. The power management unit as set forth in claim 5 wherein the conversion unit includes a diode rectifying the heartbeat signal and a low pass filter generating the output signal from the rectified heartbeat signal.

7. The power management unit as set forth in claim 5 wherein the conversion unit generates an interrupt after the heartbeat signal stops, the interrupt causing power to be disconnected from the fingerprint sensor circuitry.

8. The power management unit as set forth in claim 1 further comprising:
a power control switch connected in series between a power supply and the fingerprint sensor circuitry, the power control switch controlled by a state of a power control bit within a power management register.

9. A fingerprint detection system comprising:
a fingerprint sensor circuit;
a resistor; and
a power management unit for recovering from latchup conditions within the fingerprint sensor circuit, the power management unit comprising:
a connection to the fingerprint sensor circuit;
a detection device for detecting current drawn by the fingerprint sensor circuitry; and
a monitor coupled to the detection device and generating a heartbeat signal during normal operation of the fingerprint sensor circuitry, wherein the monitor stops producing the heartbeat signal when a change in current drawn by the fingerprint sensor circuitry indicates existence of a latchup condition within the fingerprint sensor circuitry.

10. The fingerprint detection system as set forth in claim 9 wherein the detection device comprises a resistor connected in series between a power supply and the fingerprint sensor circuitry, wherein the monitor senses changes in a voltage drop across the resistor to detect existence of a latchup condition within the fingerprint sensor circuitry.

11. The fingerprint detection system as set forth in claim 10 wherein the monitor does not indicate a latchup condition in response to false current spikes generated on a power supply providing the current drawn by the fingerprint sensor circuitry.

12. The fingerprint detection system as set forth in claim 10 wherein the monitor comprises a differential dynamic comparator having one input connected to one terminal of the resistor and a second input connected to a second terminal of the resistor.

13. The fingerprint detection system as set forth in claim 9 further comprising:
a conversion unit coupled to the monitor and generating an output signal having a first logical state when the heartbeat signal is being generated by the monitor and a second logical state when the heartbeat signal is not being generated by the monitor.

14. The fingerprint detection system as set forth in claim 13 wherein the conversion unit includes a diode rectifying the heartbeat signal and a low pass filter generating the output signal from the rectified heartbeat signal.

15. The fingerprint detection system as set forth in claim 13 wherein the conversion unit generates an interrupt after the heartbeat signal stops, the interrupt causing power to be disconnected from the fingerprint sensor circuitry.

16. The fingerprint detection system as set forth in claim 9 further comprising:
a power control switch connected in series between a power supply and the fingerprint sensor circuitry, the power control switch controlled by a state of a power control bit within a power management register.

17. For use in a fingerprint detection system, a power management method for recovering from latchup conditions comprising:
detecting current drawn by fingerprint sensor circuitry in a detection device connected to the fingerprint sensor circuitry; and
monitoring the detection device, generating a heartbeat signal during normal operation of the fingerprint sensor circuitry, and stopping the heartbeat signal when a change in current drawn by the fingerprint sensor circuitry indicates existence of a latchup condition within the fingerprint sensor circuitry.

18. The method as set forth in claim 17 wherein the step of detecting current drawn by fingerprint sensor circuitry in a detection device connected to the finger-print sensor circuitry further comprises:
sensing changes in a voltage drop across a resistor connected in series between a power supply and the fingerprint sensor circuitry to detect existence of a latchup condition within the fingerprint sensor circuitry.

19. The method as set forth in claim 17 further comprising:
resuming the heartbeat signal after occurrence of a false current spike generated on a power supply providing the current drawn by the fingerprint sensor circuitry.

20. The method as set forth in claim 17 wherein the steps of monitoring the detection device, generating a heartbeat signal during normal operation of the fingerprint sensor circuitry, and stopping the heartbeat signal when a change in current drawn by the fingerprint sensor circuitry indicates existence of a latchup condition within the fingerprint sensor circuitry further comprise:
employing a differential dynamic comparator having one input connected to one terminal of the resistor and a second input connected to a second terminal of the resistor.

21. The method as set forth in claim 16 further comprising:
generating an output signal having a first logical state when the heartbeat signal is being generated by the monitor and a second logical state when the heartbeat signal is not being generated by the monitor.

22. The method as set forth in claim 21 wherein the step of generating an output signal having a first logical state when the heartbeat signal is being generated by the monitor and a second logical state when the heartbeat signal is not being generated by the monitor further comprises:

rectifying the heartbeat signal and low pass filtering the rectified heartbeat signal to generate the output signal.

23. The method as set forth in claim 21 further comprising:

generating an interrupt after the heartbeat signal stops, the interrupt causing power to be disconnected from the fingerprint sensor circuitry.

* * * * *